United States Patent
Dardona (10) Patent No.: US 11,002,637 B2
(45) Date of Patent: May 11, 2021

(54) EMBEDDED WIRELESS AND PASSIVE SENSOR

(71) Applicant: United Technologies Corporation, Farmington, CT (US)

(72) Inventor: Sameh Dardona, South Windsor, CT (US)

(73) Assignee: Raytheon Technologies Corporation, Farmington, CT (US)

(*) Notice: Subject to any disclaimer, the term of this patent is extended or adjusted under 35 U.S.C. 154(b) by 245 days.

(21) Appl. No.: 16/205,490

(22) Filed: Nov. 30, 2018

(65) Prior Publication Data

US 2020/0173884 A1   Jun. 4, 2020

(51) Int. Cl.
*G01M 15/14* (2006.01)

(52) U.S. Cl.
CPC .................... *G01M 15/14* (2013.01)

(58) Field of Classification Search
CPC ............. G01M 15/14; F05D 2270/42; F05D 2270/80; F05D 2240/11; G01B 7/06; F01D 11/122; F01D 21/003
See application file for complete search history.

(56) References Cited

U.S. PATENT DOCUMENTS

| | | | |
|---|---|---|---|
| 6,717,420 B2 | 4/2004 | Eyraud et al. | |
| 8,111,161 B2* | 2/2012 | Lee ........................ | F01D 21/10 340/572.1 |
| 8,151,623 B2 | 4/2012 | Shinde et al. | |
| 8,482,306 B2 | 7/2013 | Andarawis et al. | |
| 9,068,906 B2* | 6/2015 | Silieti ...................... | F01D 5/32 |
| 9,200,529 B2* | 12/2015 | Buchal .................... | F01D 21/04 |
| 9,395,171 B2* | 7/2016 | Tevs ........................ | G01B 7/023 |
| 9,709,376 B2 | 7/2017 | Zhe et al. | |
| 9,939,247 B1 | 4/2018 | Dardona et al. | |
| 10,091,562 B2* | 10/2018 | Mantese .................. | F02K 3/04 |
| 10,469,920 B2* | 11/2019 | Zacchio ................... | H01P 5/02 |

(Continued)

FOREIGN PATENT DOCUMENTS

EP   3291041 A1   3/2018

OTHER PUBLICATIONS

European Search Report for European Application No. 19212947.6 dated Apr. 22, 2020.

*Primary Examiner* — Freddie Kirkland, III
(74) *Attorney, Agent, or Firm* — Carlson, Gaskey & Olds, P.C.

(57) ABSTRACT

A wear monitoring system for measuring incursion depth into an abradable coating includes a layer of abradable coating including a depth, and a measurement circuit including a plurality of conductive leads disposed within the abradable coating. The conductive leads are spaced radially apart within a common radial plane corresponding to the depth of the abradable coating. A radio frequency identification tag (RFID) is disposed within the abradable coating and connected to the measurement circuit. A plurality of resistor elements corresponds with the plurality of conductive leads. Each of the plurality of resistor elements in electrical communication with one of the plurality of conductive leads is disposed within the common radial plane of the corresponding one of the plurality of conductive leads. An electrical characteristic of the measurement circuit varies responsive to cutting of one or more of the plurality of conductive leads by a passing airfoil.

19 Claims, 5 Drawing Sheets

(56) References Cited

U.S. PATENT DOCUMENTS

| | | | |
|---|---|---|---|
| 10,480,345 B2* | 11/2019 | Dardona | F01D 11/122 |
| 10,484,760 B2* | 11/2019 | Mantese | F02K 3/04 |
| 10,677,088 B2* | 6/2020 | Lee | G01H 1/006 |
| 10,731,506 B2* | 8/2020 | Warren | G01B 7/14 |
| 2006/0056960 A1 | 3/2006 | Sabol et al. | |
| 2009/0243585 A1 | 10/2009 | Andarawis et al. | |
| 2010/0219942 A1* | 9/2010 | Lee | F01D 17/02 340/10.51 |
| 2013/0312249 A1* | 11/2013 | Buchal | F01D 11/14 29/593 |
| 2016/0369704 A1* | 12/2016 | Mantese | H04Q 1/28 |
| 2020/0157967 A1* | 5/2020 | Bishop | F01D 21/003 |
| 2020/0165934 A1* | 5/2020 | Schleif | F01D 21/003 |
| 2020/0166432 A1* | 5/2020 | Schleif | F01D 21/003 |

\* cited by examiner

EMBEDDED WIRELESS AND PASSIVE SENSOR

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section.

Abradable coatings are utilized in compressor and turbine sections on inner surfaces of a casing proximate a rotating airfoil. The abradable coating is utilized where minimizing clearances between a static casing structure and the tip of a compressor or turbine blade is desirable to increase engine efficiency. The abradable coatings are worn away by abrasive tips in the compressor and turbine sections to provide the desired clearance. The abradable coating not only provides closer clearances but also adjusts those clearances during engine operation to accommodate changes due to loading and thermal changes. While some level of wear can be estimated based on engine operation, such estimates of incursion depths of an airfoil tip into the abradable coating may not be as accurate as desired. The depth of incursion into an abradable coating as well as dynamic changes in abradable coating wear provides information that can be utilized to determine abradable coating depths and to monitor engine operating efficiencies and changes.

Turbine engine manufacturers continue to seek further improvements to engine performance including improvements to thermal, transfer and propulsive efficiencies.

SUMMARY

A wear monitoring system for measuring incursion depth into an abradable coating according to an exemplary embodiment of this disclosure includes, among other possible things, a layer of abradable coating including a depth, and a measurement circuit including a plurality of conductive leads disposed within the abradable coating. The conductive leads are spaced radially apart within a common radial plane corresponding to the depth of the abradable coating. A radio frequency identification tag (RFID) is disposed within the abradable coating and connected to the measurement circuit. A plurality of resistor elements corresponds with the plurality of conductive leads. Each of the plurality of resistor elements in electrical communication with one of the plurality of conductive leads is disposed within the common radial plane of the corresponding one of the plurality of conductive leads. An electrical characteristic of the measurement circuit varies responsive to cutting of one or more of the plurality of conductive leads by a passing airfoil.

In a further embodiment of the foregoing wear monitoring system for measuring incursion depth into an abradable coating, each of the plurality of resistor elements are arranged in parallel.

In another embodiment of any of the foregoing wear monitoring systems for measuring incursion depth into an abradable coating, at least two of the plurality of resistor elements provide a different resistance.

In another embodiment of any of the foregoing wear monitoring systems for measuring incursion depth into an abradable coating, an antenna is disposed within the abradable coating and connected to the RFID.

In another embodiment of any of the foregoing wear monitoring systems for measuring incursion depth into an abradable coating, the RFID includes a microcontroller.

In another embodiment of any of the foregoing wear monitoring systems for measuring incursion depth into an abradable coating, the RFID includes an analog to digital converter and can read both analog and digital signals.

In another embodiment of any of the foregoing wear monitoring systems for measuring incursion depth into an abradable coating, each of the resistor elements comprises a resistor element material dispersed between end leads corresponding with the corresponding one of the plurality of conductive leads.

In another embodiment of any of the foregoing wear monitoring systems for measuring incursion depth into an abradable coating, the measurement circuit is formed on an insulating layer and an encapsulating layer is applied over the measurement circuit. Each of the insulating layer, measurement circuit and encapsulating layers are disposed within separate and parallel radially extending planes.

In another embodiment of any of the foregoing wear monitoring systems for measuring incursion depth into an abradable coating, a controller communicates over a wireless communication link with the RFID, the controller receiving information over the wireless communication link indicative of a resistance of the measurement circuit.

A gas turbine engine according to an exemplary embodiment of this disclosure includes, among other possible things, an airfoil having a tip, an abradable coating that wears away responsive to incursion of the tip to define a desired clearance and a wear sensor system comprising a measurement circuit. A plurality of conductive leads are disposed within the abradable coating. The conductive leads are spaced radially apart within a common radial plane corresponding to the depth of the abradable coating. A plurality of resistor elements corresponds with the plurality of conductive leads and a radio frequency identification tag in communication with the conductive leads. An electrical characteristic of the measurement circuit varies responsive to cutting of one or more of the plurality of conductive leads by the tip. A controller is coupled through a wireless communication link with the RFID for communicating the electrical characteristic of the measurement circuit.

In a further embodiment of the foregoing gas turbine engine, each of the plurality of resistor elements are arranged in parallel.

In another embodiment of any of the foregoing gas turbine engines, an antenna is disposed within the abradable coating. The antenna is connected to the RFID for communicating over the wireless communication link with the controller.

In another embodiment of any of the foregoing gas turbine engines, the RFID is part of a structure including a microcontroller and an analog to digital converter.

In another embodiment of any of the foregoing gas turbine engines, each of the resistor elements comprises a resistor element material dispersed between end leads corresponding with the corresponding one of the plurality of conductive leads.

In another embodiment of any of the foregoing gas turbine engines, the controller in communication with the measurement circuit receives information indicative of an incursion of the airfoil into the radial depth of the abradable material.

A method of forming a wear sensor system for monitoring wear of an abradable coating according to an exemplary embodiment of this disclosure includes, among other possible things, applying a layer of abradable coating to a desired radial depth proximate an airfoil, forming a plurality of conductive leads disposed within the abradable coating, the conductive leads spaced radially apart, and assembling a plurality of resistor elements corresponding with the plurality of conductive leads. Each of the plurality of resistor elements is in electrical communication with one of the plurality of conductive leads. A radio frequency identification (RFID) is assembled to tag to the conductive leads for receiving information indicative of a changing electrical characteristic upon interruption of one of the plurality of conductive leads.

In a further embodiment of the foregoing method of forming a wear sensor system for monitoring wear of an abradable coating, assembling the plurality of conductive leads and the plurality of resistor elements includes applying an electrically conductive material within the abradable coating with an additive manufacturing process.

In another embodiment of any of the foregoing methods of forming a wear sensor system for monitoring wear of an abradable coating, an antenna is formed within the abradable coating with an additive manufacturing process and connecting the RFID tag to the antenna.

In another embodiment of any of the foregoing methods of forming a wear sensor system for monitoring wear of an abradable coating, the RFID tag is part of a structure that includes a microcontroller and an analog to digital converter and is capable of communicating over a wireless communication link with a controller separate from the abradable coating.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
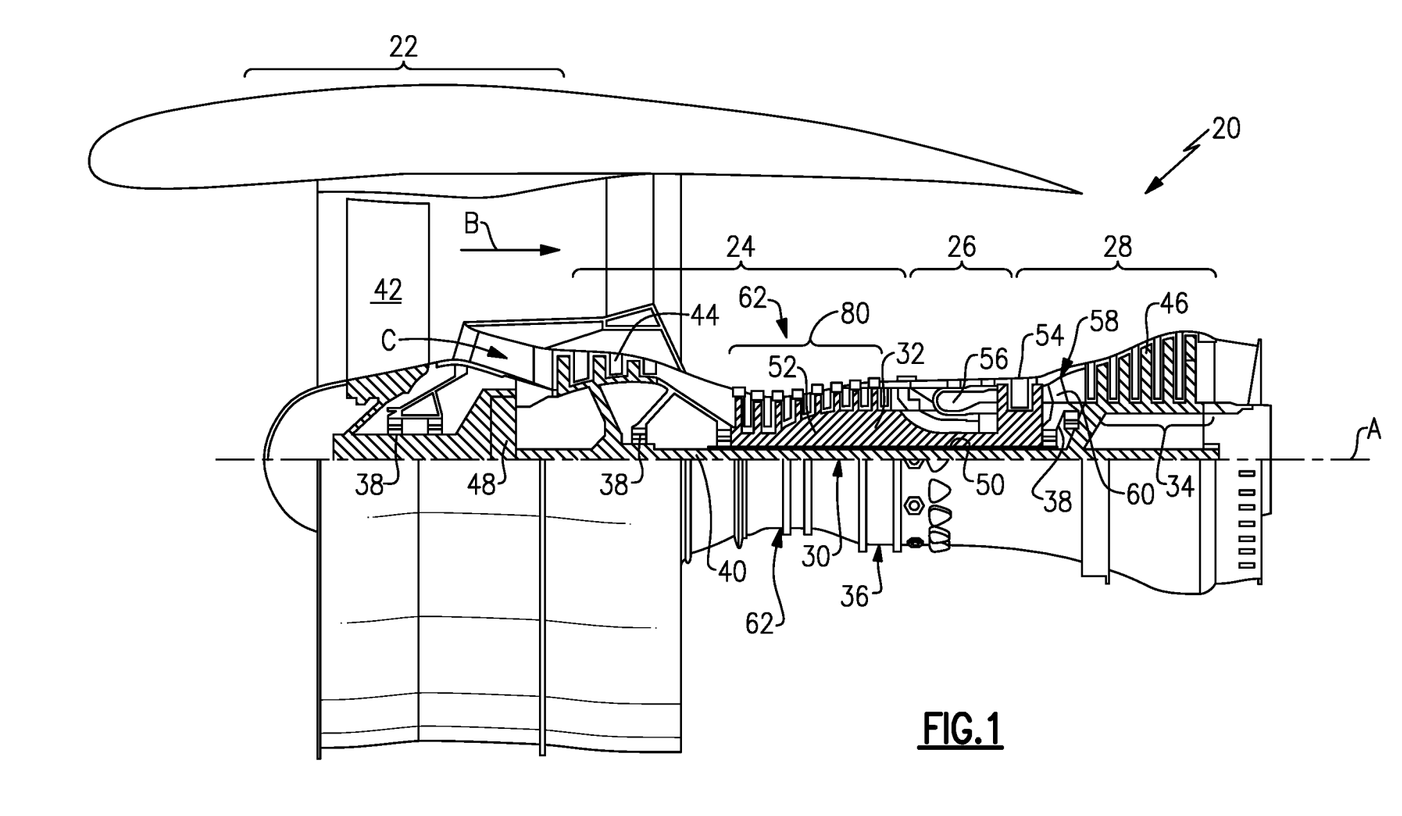
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10.67 km). The flight condition of 0.8 Mach and 35,000 ft (10.67 km), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } °R)/(518.7° R)]^{0.5}$. The "Low corrected fan tip speed" as disclosed herein according to one non-limiting embodiment is less than about 1150 ft/second (350 m/second).

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment, the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
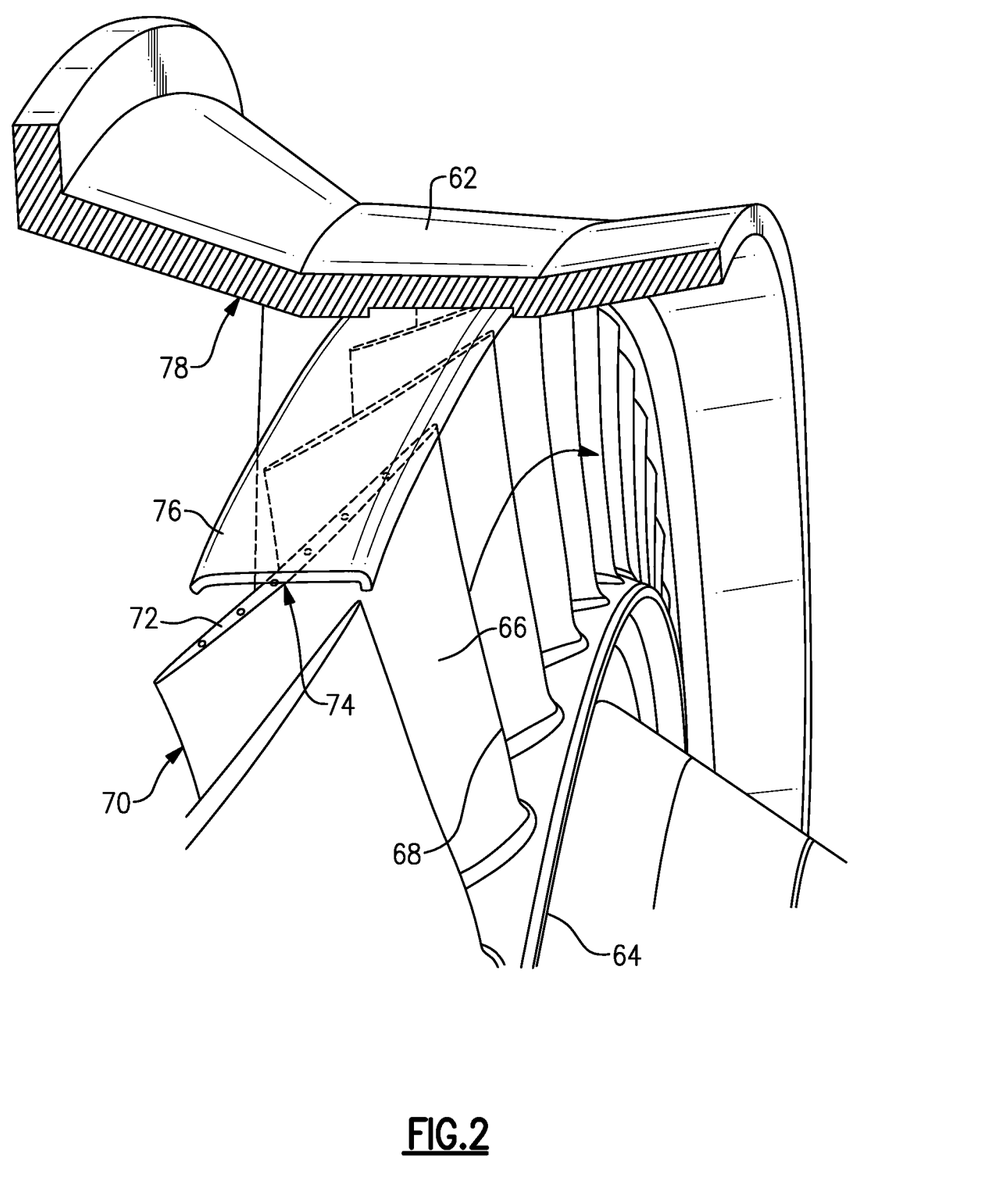
FIG. 2 is a perspective view of a compressor section of the example gas turbine engine.

Referring to FIG. 2 with continued reference to FIG. 1, the engine static structure 36 includes a compressor casing 62. The compressor casing 62 circumscribes a plurality of airfoils that drive air along the core flow path C. A wear monitoring system 80 is incorporated in the casing 62 for monitoring a wear depth of an abradable coating.

The compressor casing 62 circumscribes a plurality of airfoils 66. The airfoils 66 are supported for rotation about the engine axis A on a compressor disc 64. Each of the airfoils 66 includes a leading edge 68 and a trailing edge 70 and a tip 72. The tip 72 of each of the airfoils 66 rotates in close proximity to an inner surface 78 of the compressor casing 62. A clearance between each airfoil tip 72 and the inner surface 78 of the compressor casing 62 is minimized to increase compressor efficiency. As appreciated, large clearances between the airfoil tip 72 and the inner surface 78 of the case 62 enables air to pass around the airfoil 66 and reduces efficiency. Moreover, although airfoils 66 within the compressor section 52 are disclosed by way of example, other sections within the turbine engine 20 would benefit from and is within the contemplation of this disclosure.

An abradable coating 76 is provided on the inner surface 78 approximate to the airfoil tip 72. The abradable coating 76 is worn away by the airfoils 66 to provide clearance 74 and also to accommodate changes in relative position of the casing 62 due to thermal changes and loading. The abradable coating 76 automatically adjusts the clearance 74 in response to physical events or thermal differences and expansion. Clearance 74 is adjusted as the tip 72 wears away portions of the abradable coating 76 to a depth or modifies the path to correspond with blade rotation. Reducing clearance 74 between the tip 72 and the inner surface 78 of the casing 62 provides for an overall efficiency gain. It should be understood that although the disclosed example embodiment is explained in reference to a compressor section, a turbine section or other engine section including an interface between a rotating airfoil and an abradable coating would benefit from the system and methods of this disclosure. Moreover, any other component rotating relative to abradable coating such as for example a rotor rotating relative to a fixed vane in a compressor section would benefit from the system and methods of this disclosure and is within the contemplation of this disclosure.

Interaction between the airfoil tip 72 and the abradable coating can be estimated, but only measured once the engine is stopped and at least partially disassembled. The incursion rate of the tip 72 into the abradable coating 76 is a parameter that provides information that is indicative of improvements to engine operation and clearance. Moreover, the abrasion and wearing away of the abradable coating 76 may be a measurement utilized to trigger maintenance activities.

Figure 3:
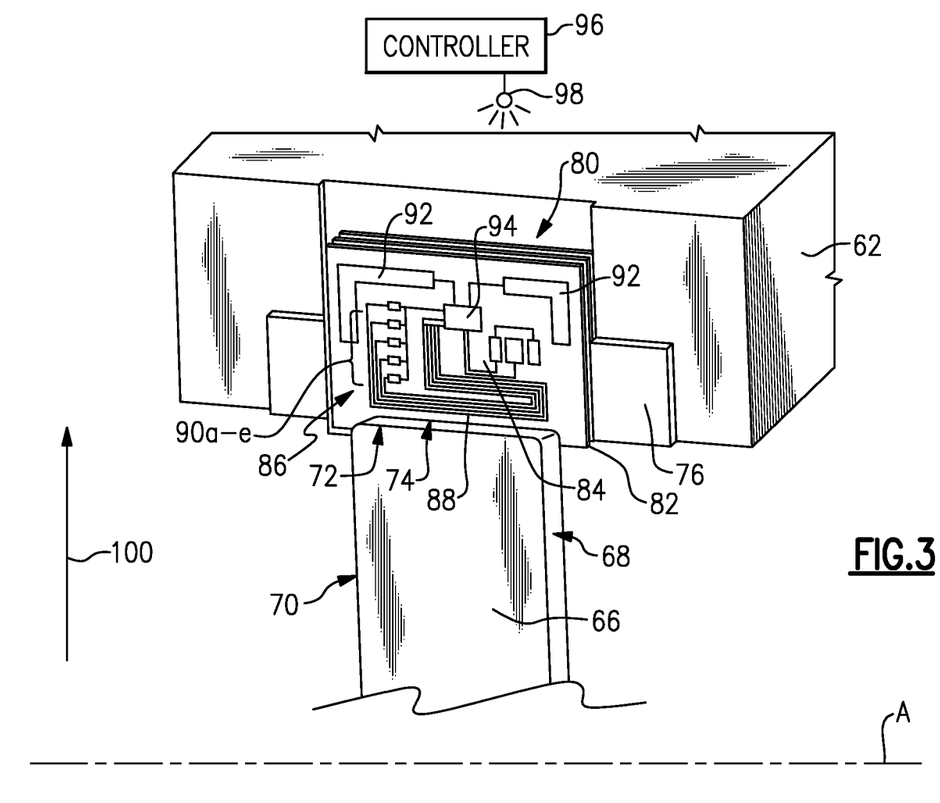
FIG. 3 is a schematic view of a wear monitoring system.
Figure 4:
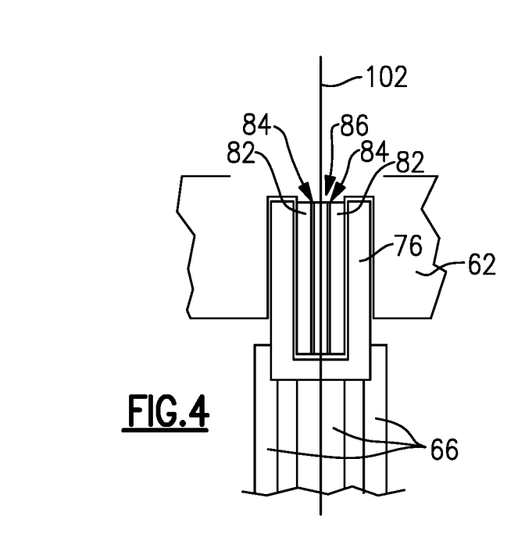
FIG. 4 is a schematic view of the wear monitoring system in a radial plane.
Figure 5:
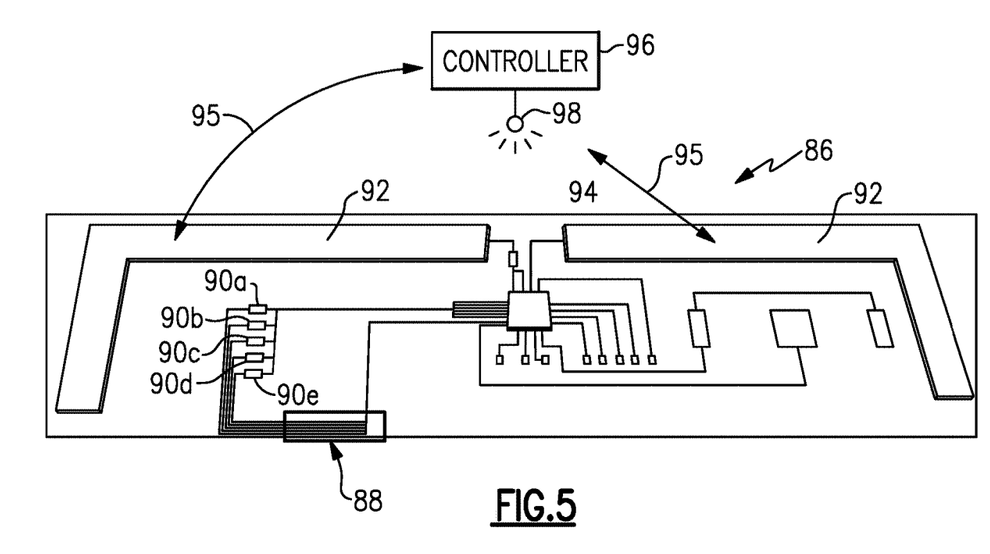
FIG. 5 is a schematic view of an example circuit for the example wear monitoring system.

Referring to FIGS. 3, 4 and 5 with continued reference to FIG. 2, a disclosed example wear monitoring system 80 includes a circuit 86 that is encapsulated within the abradable coating 76 disposed radially outward of the rotating airfoil 66. The airfoil tip 72 rotates proximate to the circuit 86 that is encapsulated within the abradable coating 76. The disclosed circuit 86 is disposed in a radial plane 102 (FIG. 4) and extends in a radial direction indicated by arrow 100 relative to the engine axis A. As the airfoil 66 rotates past the abradable coating 76 and wears portions of the abradable coating 76 away, portions of the circuit 86 are also worn away. Conductive leads 88 are in a path of the airfoil tip 72 and within the abradable coating 76. Rotation of the airfoil 66 causes the airfoil tip 72 to wear away portions of the abradable coating 76 and also portions of the circuit 86.

FIG. 5 illustrates circuit 86 separate from the abradable coating 76. The circuit 86 is a printed circuit using direct write methods and is encapsulated within an encapsulation layer 84. An insulating layer 82 is provided between the encapsulation layer 84 including the circuit 86 and the abradable coating 76. Although the example embodiment includes an encapsulation layer 84, the abradable coating 76 may be sufficiently electrically insulating to not require a separate insulating layer 82. Moreover, additional encapsulation layers 84 and insulating layers may also be utilized within the contemplation of this disclosure.

The example circuit 86 further includes antennas 92 and a radio frequency identification (RFID) tag 94 that is electrical communication with resistors 90*a-e* and conductors 88. The conductors 88 and resistors 90*a-e* generate a measurable electrical characteristic of the circuit 86 that changes responsive to incursion of the airfoil tip 72 due to wearing away or cutting of one or several of the conductive leads 88. A controller 96 is in communication with the RFID tag 94 to receive information indicative of the current electrical characteristics of the circuit 86. Communication is provided by a wireless communication link between the RFID tag 94 and the controller 96.

The example RFID tag 94 is passive and is in communication with the controller 96 through a transceiver 98. The transceiver 98 transmits a prompt signal that powers and initiates transmission of information indicative of a current resistance of the circuit 86. The example RFID tag 94 includes a microcontroller, an analog to digital converter and can rad both analog and digital signals. It should be appreciated that other RFID structures could be utilized and are within the contemplation and scope of this disclosure. For example, the RFID tag 94 could be part of package or be configured from a bare die. Additionally, the RFID tag 94 may be thinned down to create a chip with a low profile to aid in placement within the abradable coating. Antennas 92 are printed as part of the circuit 86 to enable transmission and receipt of signals schematically indicated at 95 from the transceiver 98 of the controller 96.

Figure 6:
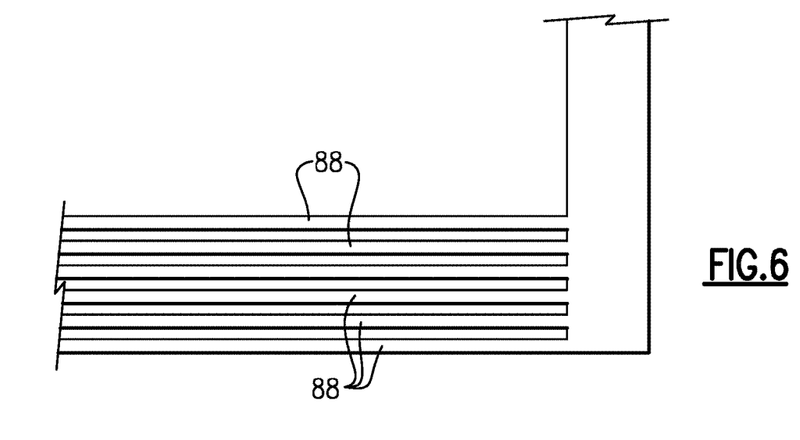
FIG. 6 is a perspective view of a portion of the example circuit of the wear monitoring system.

Referring to FIG. 6 with continued reference to FIGS. 3, 4 and 5, the circuit 86 includes the plurality of conductive leads 88 disposed proximate to the rotating tip 72. The conductive leads 88 are in electrical communication with a corresponding plurality of resistor elements 90*a-e*. The resistor elements 90*a-e* are in turn connected the RFID tag 94 to enable measurements of changing electrical characteristics along with communication of that information to the controller 96. In this example, voltage is measured for a given input current and varies responsive to a change in resistance as conductive leads 88 are severed.

During operation, the airfoil tip 72 interacts with the abradable coating 76 and wears portions of the abradable coating away including at least one or more of the embedded conductive leads 88. The conductive leads 88 within the worn away region are removed to create an open circuit corresponding with one of the plurality of resistor elements 90*a-e*. As additional ones of the conductive leads 88 are worn away, the electrical value changes and is an indication of the depth of the tip incursion into the abradable coating 76. As subsequent conductive leads 88 are worn away, the resistance of the circuit 86 will change and provide a varying electrical characteristic that corresponds with the depth of wear into the abradable coating 76.

The sensor circuit 86 extends in a radial plane 102 (Best shown in FIG. 4) from the inner surface 78 of the casing 62. The plurality of resistor elements 90*a-e* are disposed radially above the conductors 88 within that radial plane 102.

The conductive leads 88 are of printed material that is deposited on the insulating layer 82 to define the circuit 86. The antennas 92 are also formed from a printed material deposited on the layer 82. The RFID tag 94 is assembled after the circuit 86 is printed on the layer 82. The plurality of conductive leads 88 are disposed radially within and just outside of the path of rotation of the blade tips 72. In one disclosed example embodiment, the RFID tag 94 is placed in a lower temperature region than the remainder of the circuit 86. The location proximate the airfoil tip 72 can be within relatively high temperature regions that are not preferable for the RFID tag 94. The circuit 86 may than be configured to enable the RFID tag 94 to be in a relatively lower temperature region of abradable coating. The conductive leads 88 and resistors 90*a-e* are therefore disposed within a region of higher temperature than the RFID tag 94.

The plurality of conductive leads 88 are disposed in electrical communication with a corresponding one of the resistor elements 90*a-e*. Each of the conductive leads 88 is in electrical communication with a separate one of the resistor elements 90*a-e*. The plurality of resistor elements 90*a-e* are arranged in parallel and the plurality of conductive leads 88 are equally and closely spaced apart from each other in a radial direction. The closer the spacing, the greater resolution of depth incursion into the abradable coating. Accordingly, the number of conductive leads 88 and spacing is selected to provide a desired accuracy and resolution. Each of the resistor elements 90*a-e* are also printed utilizing a resistive material. The overall length and cross section of each resistor element 90*a-e* of a uniform length provides the desired resistance value that corresponds with one of the conductive leads 88.

Figure 7:
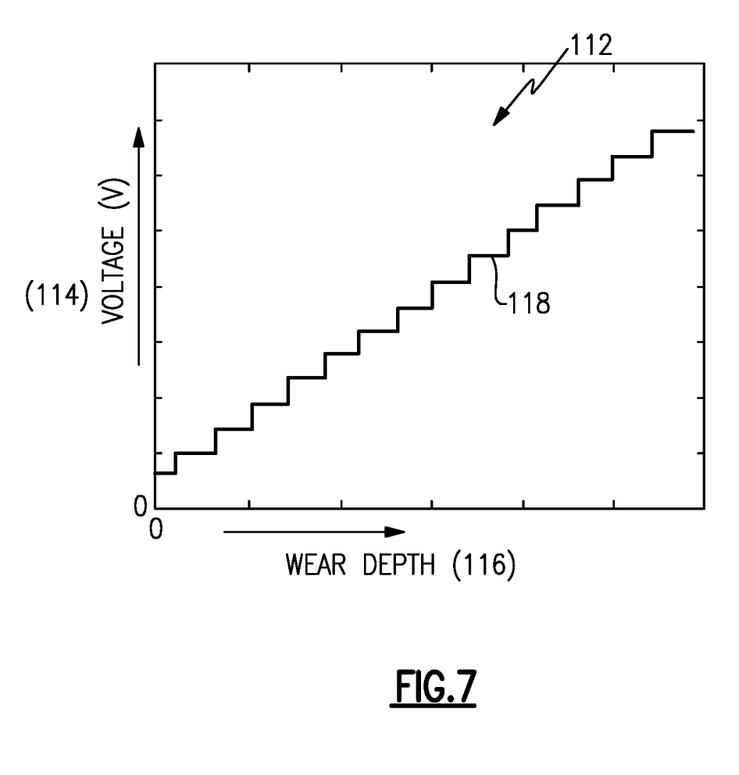
FIG. 7 a graph illustrating a relationship between an electrical characteristic and wear depth.

Referring to FIG. 7, an example relationship between voltage 114 and wear depth 116 is illustrated by graph 112. The graph 112 illustrates a plurality of steps 118 that are substantially uniform. Each step 118 represents a cutting or severing of one of the conductive leads 88. As subsequent conductive leads are cut, the resistance and thereby the voltage 114 read by the RFID tag 94 and communicated to the controller 96 changes.

The values of the resistor elements are determined to provide the illustrated uniform step change in voltage. In the disclosed embodiment, a resistance value for each resistor element is determined according to a defined relationship. As the airfoil tip 72 interacts with the circuit 86 and removes a conductive lead 88 and thereby the corresponding one of the resistor elements 90*a-e*, the equivalent resistance is changed. The amount of change in voltage depends on the number of resistor elements 90*a-e*, the current source and the value of each resistor element 90*a-e*. In this example, the overall resistance decreases inversely with the number of resistor elements 90*a-e* remaining in the circuit 86. In this example, an equal amount of voltage change is provided with each cut conductive lead 88 by providing resistor elements with different values.

One non-limiting embodiment of relative resistor element values includes a first resistor element with a value R, a second resistor element with a value $R*(N-1)$, a third resistor element with a value $R*(N-1)*(n-2)/N$, $N-1$ resistor element with a value $6*R/N$ and an Nth resistor element with a resistance value $2*R/N$, where N equal the number of resistor elements and conductive leads. As appreciated, other resistor element values that provide a consistent uniform change in voltage are also within the contemplation of this disclosure. Moreover, although the example resistor elements are provided in a parallel configuration, other configurations are within the contemplation of this disclosure.

The example wear sensing system may be utilized as part of initial testing and verification of an engine but is also contemplated to be part of an in-situ system that can provide information to trigger maintenance functions or even to alert an aircraft operator or pilot of specific wear depths that may be relevant to overall engine operation.

Accordingly, the example wear sensor system provides an in-situ evaluation and monitoring of blade tip incursion into abradable coating circumscribing airfoils within the compressor, turbine, or fan sections of a gas turbine engine.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A wear monitoring system for measuring incursion depth into an abradable coating comprising:
   a layer of abradable coating including a depth;
   a measurement circuit including a plurality of conductive leads disposed within the abradable coating, the conductive leads spaced radially apart within a common radial plane corresponding to the depth of the abradable coating;
   a radio frequency identification tag (RFID) disposed within the abradable coating and connected to the measurement circuit;

a plurality of resistor elements corresponding with the plurality of conductive leads, each of the plurality of resistor elements in electrical communication with one of the plurality of conductive leads disposed within the common radial plane of the corresponding one of the plurality of conductive leads; wherein an electrical characteristic of the measurement circuit varies responsive to cutting of one or more of the plurality of conductive leads by a passing airfoil.

2. The wear monitoring system as recited in claim 1, wherein each of the plurality of resistor elements are arranged in parallel.

3. The wear monitoring system as recited in claim 2, wherein at least two of the plurality of resistor elements provide a different resistance.

4. The wear monitoring system as recited in claim 1, including an antenna disposed within the abradable coating and connected to the RFID.

5. The wear monitoring system as recited in claim 4, wherein the RFID includes a microcontroller.

6. The wear monitoring system as recited in claim 5, wherein the RFID includes an analog to digital converter and can read both analog and digital signals.

7. The wear monitoring system as recited in claim 1, wherein each of the resistor elements comprises a resistor element material dispersed between end leads corresponding with the corresponding one of the plurality of conductive leads.

8. The wear monitoring system as recited in claim 1, wherein the measurement circuit is formed on an insulating layer and an encapsulating layer is applied over the measurement circuit, wherein each of the insulating layer, measurement circuit and encapsulating layers are disposed within separate and parallel radially extending planes.

9. The wear monitoring system as recited in claim 1, including a controller communicating over a wireless communication link with the RFID, the controller receiving information over the wireless communication link indicative of a resistance of the measurement circuit.

10. A gas turbine engine comprising:
an airfoil having a tip;
an abradable coating that wears away responsive to incursion of the tip to define a desired clearance;
a wear sensor system comprising a measurement circuit including a plurality of conductive leads disposed within the abradable coating, the conductive leads spaced radially apart within a common radial plane corresponding to the depth of the abradable coating, a plurality of resistor elements corresponding with the plurality of conductive leads and a radio frequency identification tag disposed within the abradable coating and in communication with the conductive leads, wherein an electrical characteristic of the measurement circuit varies responsive to cutting of one or more of the plurality of conductive leads by the tip; and
a controller coupled through a wireless communication link with the RFID for communicating the electrical characteristic of the measurement circuit.

11. The gas turbine engine as recited in claim 10, wherein each of the plurality of resistor elements are arranged in parallel.

12. The gas turbine engine as recited in claim 10, including an antenna disposed within the abradable coating, the antenna connected to the RFID for communicating over the wireless communication link with the controller.

13. The gas turbine engine as recited in claim 12, wherein the RFID is part of a structure including a microcontroller and an analog to digital converter.

14. The gas turbine engine as recited in claim 10, wherein each of the resistor elements comprises a resistor element material dispersed between end leads corresponding with the corresponding one of the plurality of conductive leads.

15. The gas turbine engine as recited in claim 10, wherein the controller in communication with the measurement circuit receives information indicative of an incursion of the airfoil into the radial depth of the abradable material.

16. A method of forming a wear sensor system for monitoring wear of an abradable coating comprising:
applying a layer of abradable coating to a desired radial depth proximate an airfoil;
forming a plurality of conductive leads disposed within the abradable coating, the conductive leads spaced radially apart;
assembling a plurality of resistor elements corresponding with the plurality of conductive leads, each of the plurality of resistor elements in electrical communication with one of the plurality of conductive leads; and
assembling a radio frequency identification (RFID) tag within the abradable coating to the conductive leads for receiving information indicative of a changing electrical characteristic upon interruption of one of the plurality of conductive leads.

17. The method as recited in claim 16, wherein assembling the plurality of conductive leads and the plurality of resistor elements includes applying an electrically conductive material within the abradable coating with an additive manufacturing process.

18. The method as recited in claim 17, including forming an antenna within the abradable coating with an additive manufacturing process and connecting the RFID tag to the antenna.

19. The method as recited in claim 18, wherein the RFID tag is part of a structure including a microcontroller and an analog to digital converter and is capable of communicating over a wireless communication link with a controller separate from the abradable coating.

* * * * *